Dec. 21, 1943.   D. P. JACOBUS ET AL   2,337,107

SCALE PIVOT MOUNTING

Filed Dec. 17, 1941

INVENTORS
DALE P. JACOBUS
GULDBRAND GULDBRANDSEN
BY
ATTORNEY.

Patented Dec. 21, 1943

2,337,107

UNITED STATES PATENT OFFICE 2,337,107

SCALE PIVOT MOUNTING

Dale P. Jacobus and Guldbrand Guldbrandsen, St. Johnsbury, Vt., assignors to Fairbanks, Morse & Co., Chicago, Ill., a corporation of Illinois Application December 17, 1941, Serial No. 423,346

5 Claims. (Cl. 308—2)

This invention relates to improvements in scale pivot mountings for weighing equipment generally, and particularly to improvements in pivot mountings for the levers of weighing scales.

The principal object of the invention is the provision of reliable and inexpensive means for securing a pivot element to a scale lever or other scale member, which means are of a character to permit the knife-edge to be readily removed as for replacement purposes. Other objects of the improvement are to afford adjustment facilities for varying, within limits, the location of the pivotal axis both longitudinally and transversely of the lever, so that the distance between pivots can be adjusted, and for locking the pivot members in their set positions.

Other objects and advantages will be apparent from the following description, in which reference is had to the accompanying drawing illustrating preferred embodiments of my invention and wherein similar reference numerals designate similar parts throughout the several views.

Figure 1:
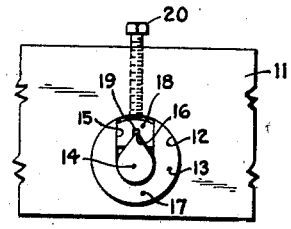
Fig. 1 is a side elevation of a section of a lever equipped with pivot means of one form of my invention.
Figure 2:
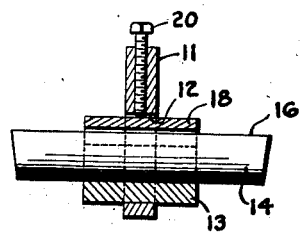
Fig. 2 is a transverse sectional view of the pivot means of Fig 1.
Figure 3:
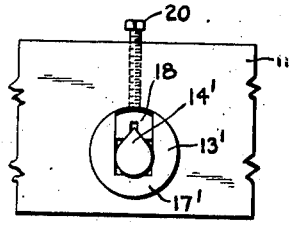
Figs. 3, 5, 7 and 9 are modifications of the assembly shown in Fig. 1.
Figure 4:
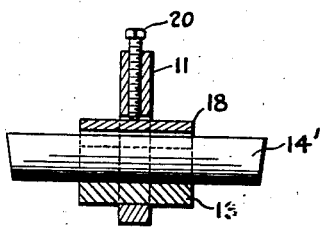
Figs. 4, 6, 8 and 10 are sectional views of the modifications shown respectively in Figs. 3, 5, 7 and 9.
Figure 5:
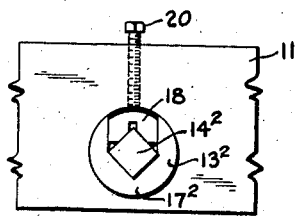
Figure 6:
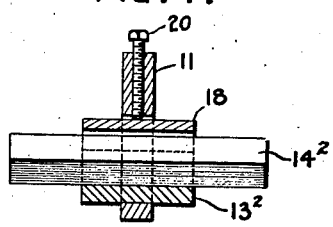
Figure 7:
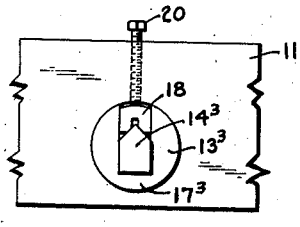
Figure 8:
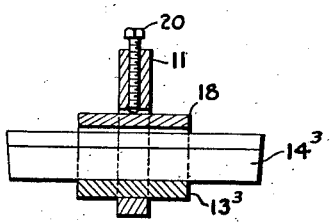
Figure 9:
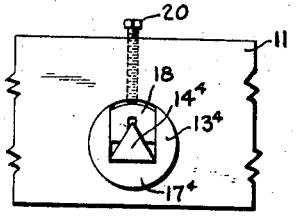
Figure 10:
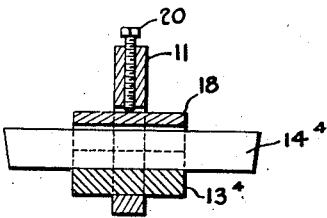

Referring now by characters of reference to the drawing, particularly Figs. 1 and 2, numeral 11 indicates a fragmentary portion of a scale lever. The lever is provided with a transverse cylindrical bore 12 and fitting snugly within said bore is a cylindrical member 13 that forms a holder or retainer for knife-edge or pivot element 14. Holder 13 is provided with a longitudinal channel 15 to receive pivot element 14, channel 15 being of sufficient depth to accommodate pivot element 14 entirely within the periphery of the retainer member. The internal bottom surface of the channel 15 may be desirably shaped to conform to the back surface of the particular pivot member to be accommodated. For example, where a four-edged or square pivot is employed, such as $14^2$, (Fig. 5) the channel bottom is desirably of V-form. Similarly, for a single-edge pivot of the so-called chestnut type the bottom of the channel may be desirably rounded to conform to the back surface of such a pivot member. In most instances the channel bottom may be flat, thereby adapting the holder member for use with a chestnut type pivot, $14^1$, as shown in Fig. 3, the single-edged flat bottom pivot $14^3$ of Fig. 7, or the triangular pivot $14^4$ of Fig. 9.

The pivot element is placed in the channel of the retainer member with its bearing edge 16 located centrally and directed toward the open side, or mouth of the channel 15. Such channel extends depthwise beyond the center of the retainer member so that a relatively narrow neck of metal, indicated at 17, connects the opposite side portions of the member 13. A further characteristic in the relationship of the pivot element 14 and its holder 13 is that the bearing edge 16 lies eccentrically of the bore 12. Consequently, by turning of the retainer member in the bore the position of the bearing edge 16 is shifted in an arcuate path extending generally longitudinally of the lever. The described arrangement and disposition of the parts enable the position of bearing edge on the lever to be adjusted with nicety.

The pivot element 14 is secured in place by a clamp block 18 which is formed to fit snugly in the channel 15. The block 18 seats upon the convergent surfaces of the bearing element and is provided with a V-shaped groove to accommodate that element. A kerf 19 extends along the apex of the groove in the clamping block and provides a space into which projects the sharp edge of the pivot, preventing mutilation thereof.

For clamping the elements in place there is provided a clamping bolt 20 which is threaded in a bore extending edge-wise of the lever. The inner end of the clamping bolt bears upon the back of the clamping block at the center thereof, opposite kerf 19. It will now appear that by turning bolt 20 to thread the same inwardly, pressure is exerted on the clamping block. Since the clamping block is seated on the convergent surface of the bearing element the bolt pressure forces block 18 tightly against the pivot element and tends to spread the opposed leg portions of this U-shaped or bifurcated clamping block. Such spreading movement is transmitted to the opposed leg portions of the U-shaped retainer member 13 which tends to expand laterally and become tightly lodged in the lever opening 12. In this manner all of the elements of the mounting assembly are securely held, yet may be quickly released as for purposes of changing the pivot element or adjusting the location of the knife-edge, simply by loosening clamping bolt 20.

What we claim and desire to secure by Letters Patent is:

1. In a scale, a scale member having an opening therethrough, a pivot retainer extending through said opening, said retainer having a deep longitudinal groove, a knife-edge pivot element disposed within said groove with its back surface seating against the bottom thereof, a U-shaped clamping block disposed snugly within said groove astride the knife-edge portion of said pivot element, and a clamp screw threaded in said scale member with its inner end abutting the back of said clamping block, said clamp screw being adapted to urge said bock inwardly of the retainer groove, whereby to spread said clamping block by the wedge action thereon of said pivot element.

2. In a scale, the combination with a scale member having a circular bore, a pivot holder journalled for rotary adjustment in said bore, said holder having a deep, axially extending groove therein, a pivot element having converging surfaces forming a knife-edge disposed in said groove with its knife-edge facing the mouth of said groove and its back surface seating against the bottom of said groove, a bifurcated clamping block fitting snugly in said groove with its furcations bearing upon the opposite sloping surfaces of the pivot element, and a clamping screw threaded in said scale member and adapted to urge the clamping block toward the pivot element, whereby said clamping block and pivot holder are caused to spread laterally under the wedging action of the pivot element, into binding engagement with each other and with the scale member.

3. In a scale, a member having a circular bore, a U-shape pivot holder snugly fitting said bore and adapted to be rotatably adjusted therein, a U-shaped clamping block fitting snugly between the legs of the pivot member in an inverted position relative thereto, a pivot element seated between the leg portions of said holder with its knife edge directed toward and disposed between the legs of said clamping block, and a clamping bolt threaded in said member with its inner end abutting the back of the clamping block, adapted to force the leg portions of said clamping block against the sloping surfaces of said pivot element, thereby tending to spread the leg portion of said U-shaped parts into binding engagement with each other and with said member.

4. The combination with a scale lever having a transverse cylindrical bore, a cylindrical pivot holder rotatably adjustable in said bore, a deep, longitudinally extending channel having parallel side surfaces, formed in the pivot holder, a knife-edge pivot element disposed in the channel of said holder with its back surface seating against the channel bottom and its knife-edge off-set from the axis of rotation of the pivot holder, a bifurcated clamping block fitting snugly within the channel of said pivot holder with its furcations bearing upon the divergent surfaces of said pivot element, astride the knife-edge, and a clamp screw mounted in the lever to bear against the back of said clamping block, said clamping block being adapted to be expanded by the wedging action thereon of the pivot member.

5. In combination with a scale lever having a transverse cylindrical bore, a pivot holder snugly fitting and rotatably adjustable in said bore, a longitudinally extending channel having parallel side surfaces formed in said pivot holder, a knife-edge pivot element mounted in the channel of said holder with its back surface seating against the channel bottom and its knife-edge non-coincident with the axis of rotation of the pivot holder, a laterally expandible clamping block fitting snugly within the channel of said pivot holder, and screw means acting to force the block inwardly of the channel and to clamp the pivot element between said block and the channel bottom, said block being recessed to receive the knife edge of said pivot element and adapted to expand laterally under the wedging action thereon of the pivot element, the said lateral expansion of the block effecting an expansion of the pivot holder to clamp that member in the lever bore.

DALE P. JACOBUS.
GULDBRAND GULDBRANDSEN.